US005365259A

United States Patent [19]
Kanoto et al.

[11] Patent Number: 5,365,259
[45] Date of Patent: Nov. 15, 1994

[54] SCANNING OPTICAL DEVICE

[75] Inventors: Masanobu Kanoto; Yasuo Suzuki, both of Tokyo, Japan

[73] Assignee: Canon Kabushiki Kaisha, Tokyo, Japan

[21] Appl. No.: 163,406

[22] Filed: Dec. 8, 1993

Related U.S. Application Data

[63] Continuation of Ser. No. 673,127, Mar. 20, 1991, abandoned.

[30] Foreign Application Priority Data

Mar. 23, 1990 [JP] Japan .................................. 2-73980
Mar. 11, 1991 [JP] Japan ................................. 3-044895

[51] Int. Cl.$^5$ ............................................. H04N 1/21
[52] U.S. Cl. ................................................. 346/108
[58] Field of Search ............... 346/1.1, 107 R, 108, 346/139 R, 160; 359/204, 205, 206, 210, 211

[56] References Cited

U.S. PATENT DOCUMENTS

| | | | |
|---|---|---|---|
| 4,796,962 | 1/1989 | DeJager et al. | 359/206 |
| 4,796,963 | 1/1990 | Yoshimura | 359/206 |
| 4,796,963 | 1/1989 | Negoro | 346/108 |

FOREIGN PATENT DOCUMENTS

WO8807698 10/1988 WIPO .............. G02B 26/10

Primary Examiner—Mark J. Reinhart
Attorney, Agent, or Firm—Fitzpatrick, Cella, Harper & Scinto

[57] ABSTRACT

A scanning optical device focuses a laser beam emitted by a laser oscillator by a first lens, scans it by a deflector to direct it onto a medium to be scanned, by a second lens, deflects a portion of the light transmitted through the second lens by a stationary mirror, directs it to a photo-sensor by a third lens and uses an output of the photo-sensor to trigger a horizontal synchronous signal. At least two of the first lens, the second lens and the third lens are integrally formed.

49 Claims, 13 Drawing Sheets

F I G. 10
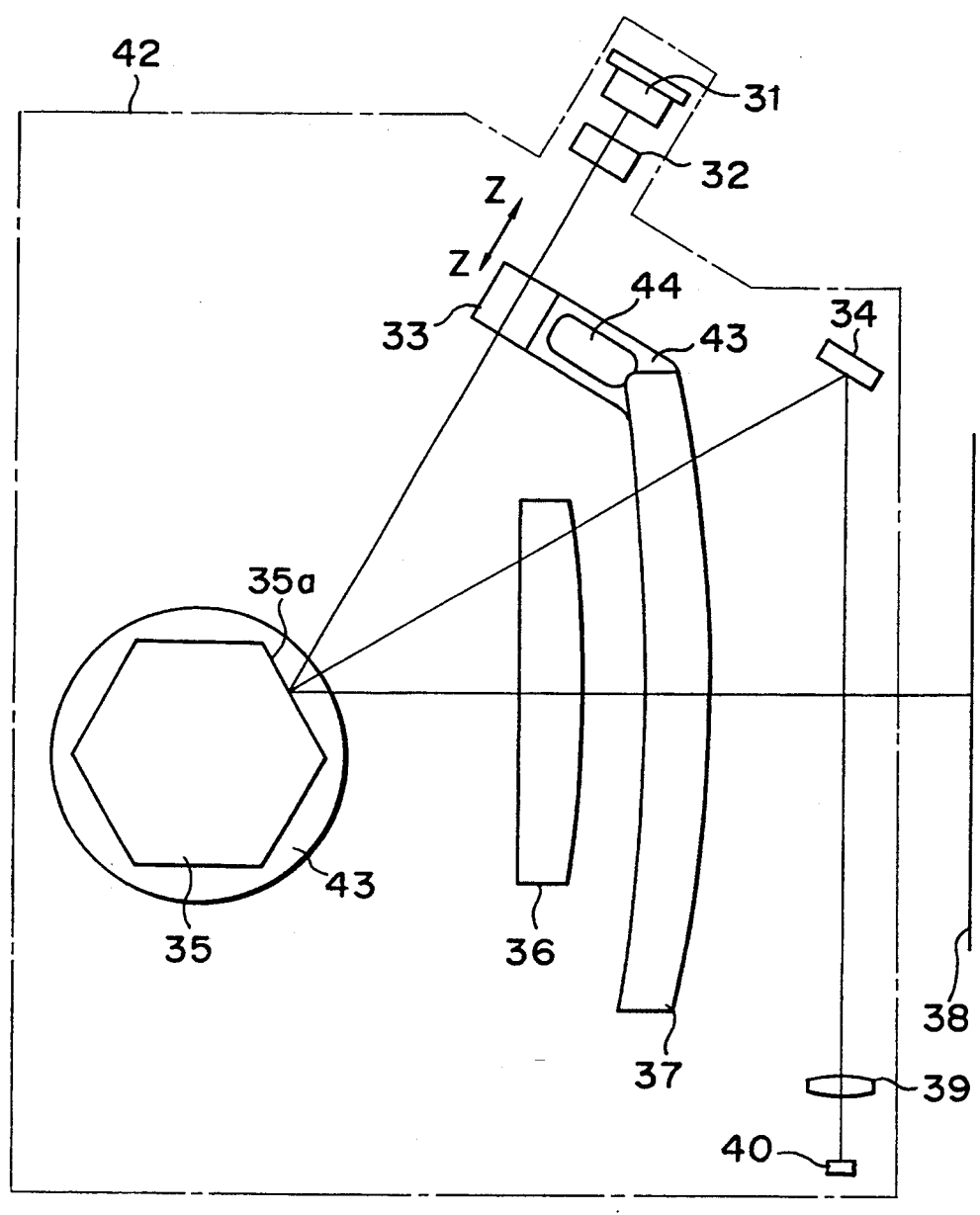

F I G. 16
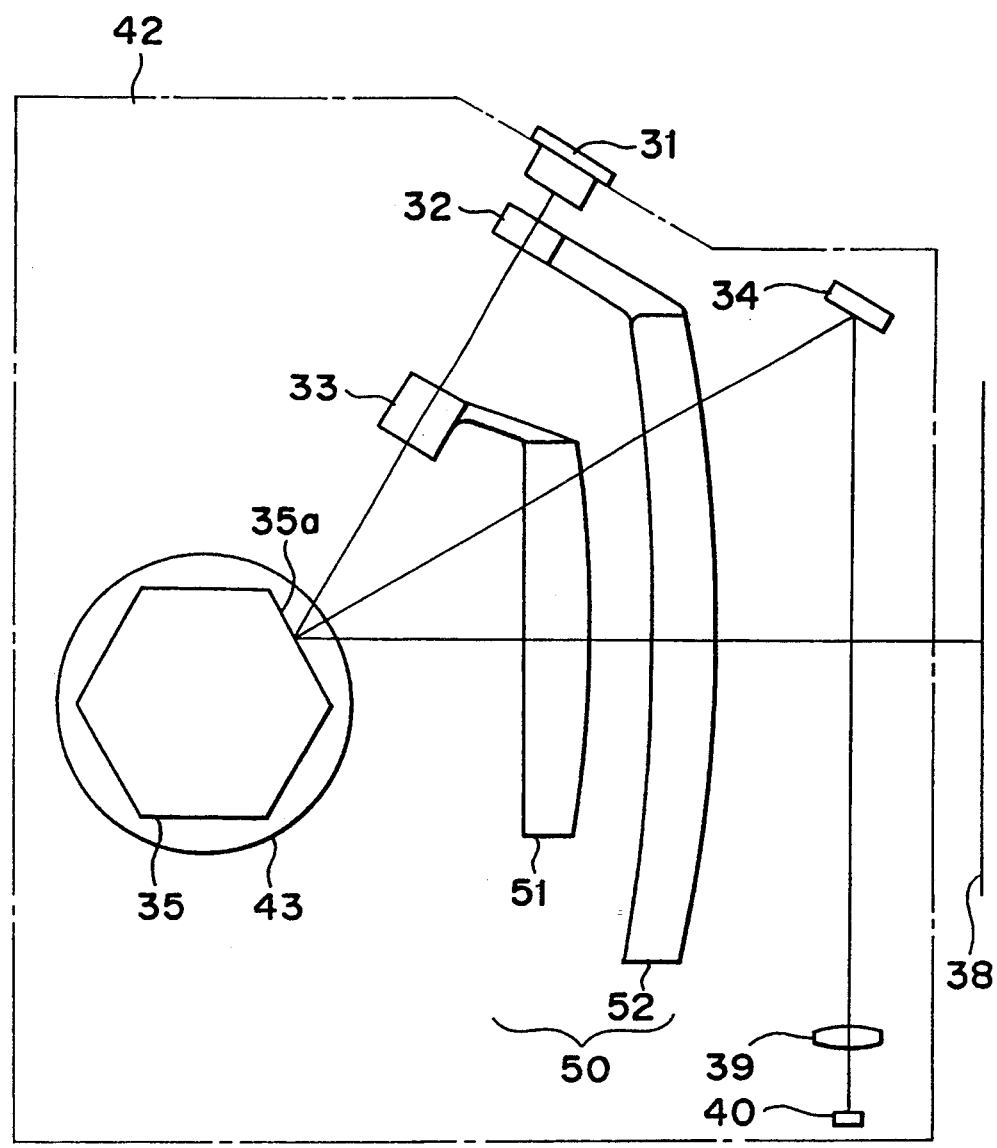

SCANNING OPTICAL DEVICE

This application is a continuation of application Ser. No. 07/673,127 filed Mar. 20, 1991, now abandoned.

BACKGROUND OF THE INVENTION

1. Field of the Invention

The present invention relates to a scanning optical device used in a laser printer or the like.

2. Related Background Art

FIG. 1 shows a prior art scanning optical device of a laser printer. A collimator lens 3 and a rotating polygon mirror 4 are arranged on an optical axis of a laser diode 2 which emits light in accordance with a signal from a control circuit 1. The rotating polygon mirror 4 is rotated at a constant velocity in a direction of an arrow by a scanner motor 5. An fθ lens 6 is arranged on a reflection side of the rotating polygon mirror 4, and a photoconductor drum 7 which serves as a focal plane is arranged in a direction of transmission. A stationary mirror 8 is arranged in the vicinity of an end of the photoconductor drum 7. A condenser lens 9, a slit 10 and a photo-sensor (or light receiving element) 11 are arranged in sequence on the reflection side of the stationary mirror 8, and an output of the photo-sensor 11 is supplied to the control circuit 1.

The light emitted from the laser diode 2 is collimated by the collimator lens 3, reflected by the rotating polygon mirror 4, has the scanning velocity thereof on the photoconductor drum 7 fixed by the fθ lens, and is focused onto the photoconductor drum 7. When the scanning light is reflected by the stationary mirror in the vicinity of the end of the photoconductor drum 7, it is condensed by the condenser lens 9 and directed to the photo-sensor 11 through the slit 10. The output of the photo-sensor 11 is applied to the control circuit 1 as a horizontal synchronous signal. Image information to be recorded on the photoconductor drum 7 is supplied to the laser diode 2 a predetermined time after the input of the horizontal synchronous signal.

However, in the above prior art device, at least three lenses, the collimator lens 3, the fθ lens 6 and the condenser lens 9 are needed and they require high precision relative positioning.

SUMMARY OF THE INVENTION

It is an object of the present invention to provide a scanning optical device which is simple in construction and easy to keep a positional precision among lenses.

In order to achieve the above object, the scanning optical device of the present invention condenses a laser beam emitted from a laser oscillator by a first lens, deflected by a deflector, directed to a medium to be scanned by a second lens, and a portion of the light transmitted through the second lens is deflected by a stationary mirror and directed to a photo-sensor by a third lens, and an output of the photo-sensor is used to trigger a horizontal synchronous signal. At least two of the first lens, the second lens and the third lens are formed integrally.

The scanning optical device of the present invention has a reduced number of lenses so that the positional precision between the lenses is enhanced.

BRIEF DESCRIPTION OF THE DRAWINGS

FIGS. 2 to 6 show embodiments of a scanning optical device of the present invention, in which;

FIG. 2 shows a plan view of a first embodiment of the scanning optical device of the present invention, FIG. 3 shows a perspective view of FIG. 2, FIG. 4 shows a plan view of a second embodiment of the scanning optical device of the present invention, FIG. 5 shows a perspective view of a complex lens, and FIG. 6 shows a plan view of a third embodiment of the scanning optical device of the present invention, FIG. 10 shows a sectional view of a seventh embodiment of the scanning optical device of the present invention, FIG. 13 shows a sectional view of a tenth embodiment of the scanning optical device of the present invention, FIG. 16 shows a sectional view of a thirteenth embodiment of the scanning optical device of the present invention.

DETAILED DESCRIPTION OF THE PREFERRED EMBODIMENTS

Figure 1:
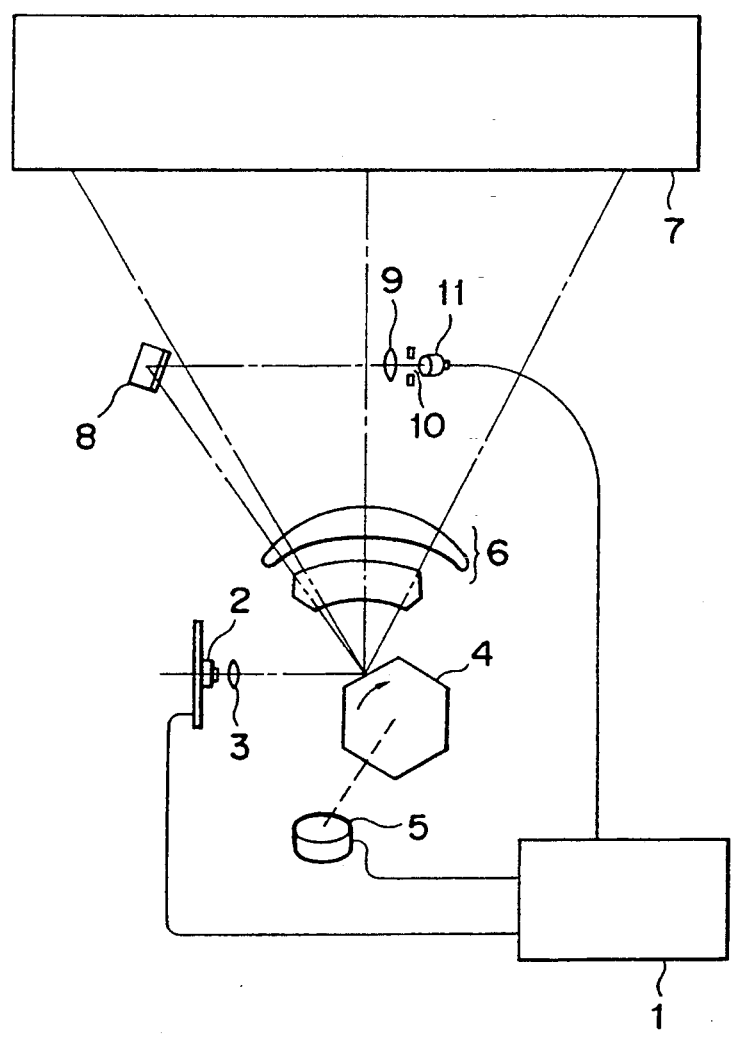
FIG. 1 shows a plan view of a scanning optical device used in a prior art laser printer.

The present invention is now explained for the embodiments shown in FIGS. 2 to 6, in which the like numerals to those of FIG. 1 denote the elements of the like functions.

Figure 2:
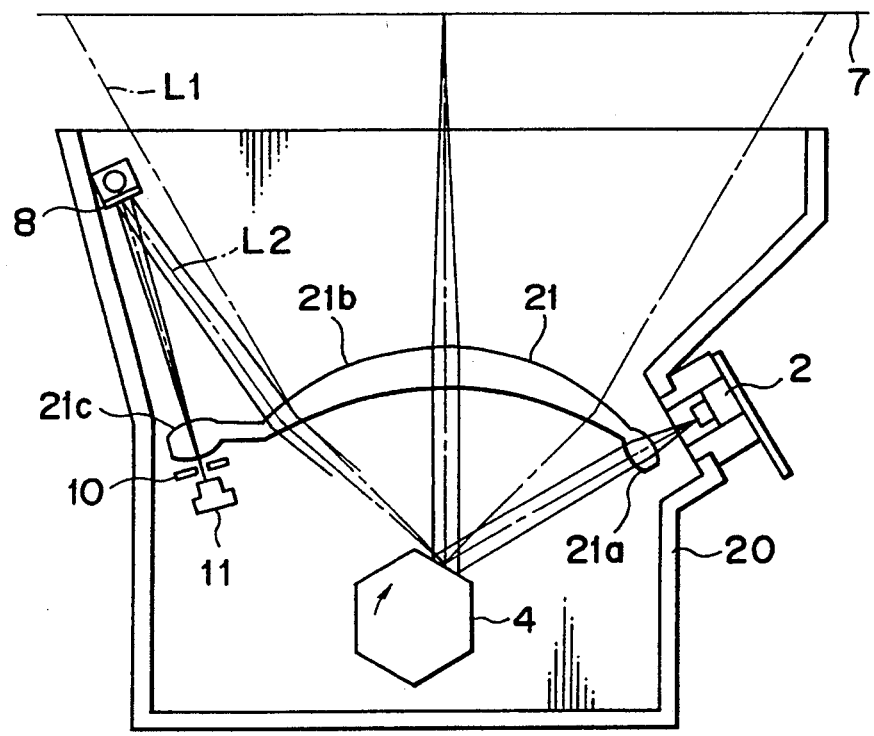
Figure 3:
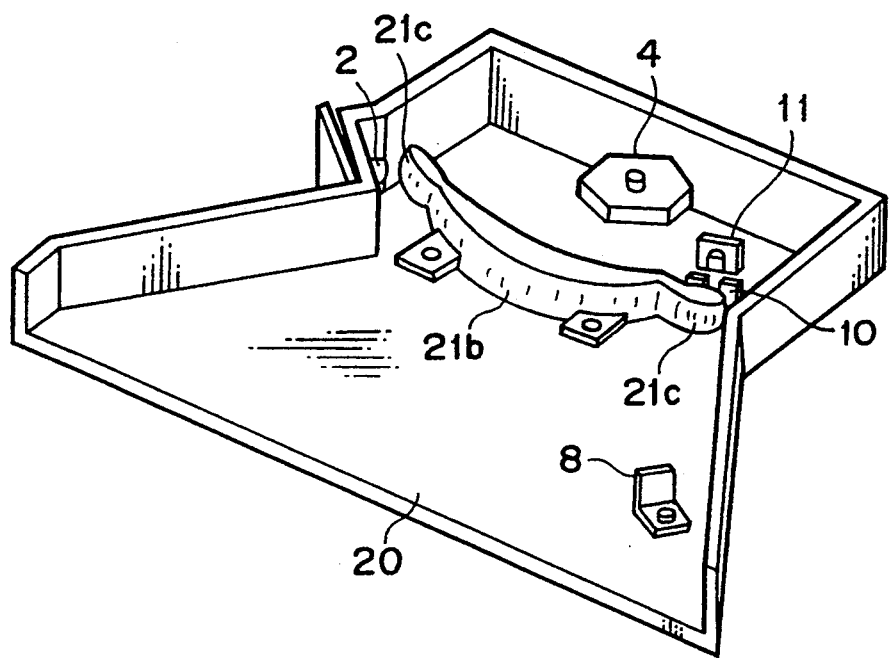

FIG. 2 shows a plan view of a first embodiment of the scanning optical device of the present invention, and FIG. 2 shows a perspective view thereof. A housing 20 which is molded by synthetic resin has an opening which faces a photoconductor (or photosensitive) drum 7 which is a medium to be scanned. An arcuate lens 21 integrally molded by transparent synthetic resin such as acryl or polycarbonate is mounted at a center of the housing 20 to face the opening. A rotating polygon mirror 4 which is a deflector is mounted below the lens 21 and it is rotated by a scanner motor in a direction of an arrow. A collimator lens 21a is formed at one end of the lens 21, a central portion of the lens 21 serves as an fθ lens 21b, and a condenser lens 21c is formed at the other end of the lens 21. A laser diode 2 is arranged externally of the collimator lens 21a, a stationary mirror 8 is arranged externally of the condenser lens 21c, and a slit 10 and a photo-sensor (or light receiving element) 11 are arranged in sequence internally of the condenser lens 21c.

The rotating polygon mirror 4 is rotated at a constant velocity by the motor (not shown) so that a spot formed on the photoconductor drum 7 by focusing the light emitted from the laser diode 2 which serves as a light source is moved along a main scan direction. The photoconductor drum 7 is rotated around its axis to effect sub-scan. In this manner, an electrostatic latent image is formed on the surface of the photoconductor drum 7.

Arranged around the photoconductor drum 7 are a corona discharger for uniformly charging the surface of the photoconductor drum 7, a developing unit for visualizing the electrostatic latent image formed on the surface of the photoconductor drum 7 into a toner image, and a transferring corona discharger for transferring the toner image onto a record sheet (all not shown). By the functions of those elements, record information corresponding to the light beam emitted by the laser diode 2 is printed on the record sheet.

The fθ lens 21 is designed such that the light beam reflected by the rotating polygon mirror 4 is focused to form the spot on the photoconductor drum 7 and the scanning velocity of the spot is kept constant. In order to attain the characteristic of the fθ lens 21, the fθ lens 21 is formed by a non-spherical lens or a toric lens.

The laser beam emitted from the laser diode 2 is collimated by the collimator lens 21a and directed to a deflection and reflection plane of the rotating polygon mirror 4, and the reflected light is focused by the fθ lens 21b and scans the photoconductor drum 7 (which serves as a recording medium) at the constant scanning velocity. When the scanning light transmitted through the fθ lens 21b is reflected by the stationary mirror 8 at the beginning or the end of one scan, it is directed to the condenser lens 21c and to the photo-sensor 11 through the slit 10, and a horizontal synchrous circuit is sent from the photo-sensor 11 to a control circuit (not shown). In this manner, the horizontal synchronous signal is detected to determine the start timing of the modulation of the laser diode 2 by the record information.

The stationary mirror 8 is arranged on a light path L2 which is upstream of a light path L1 corresponding to a start position to write the record information on the photoconductor drum 7. The light beam reflected by the stationary mirror 8 is directed to a photo-sensing plane of the photo-sensor 11 which may comprise a photo-diode. As a result, when the photo-sensing plane of the photo-sensor 11 is irradiated by the light beam deflected and scanned by the rotating polygon mirror 4, the photo-sensor 11 produces a signal to detect the position scanned by the light beam. The signal is applied to the control circuit (not shown).

The laser diode 2 which serves as the light source generates the light beam in accordance with a signal supplied from the control circuit which processes information supplied from a host computer. The signal produced by the laser diode 2 corresponds to the information to be written to the photoconductor drum 7 so that an electrostatic latent image corresponding to the desired information is formed on the photoconductor drum 7. The control circuit supplies to the laser diode 2 as one unit a signal which represents the information corresponding to one scan line which is a locus formed by the spot of the light beam on the surface of the photoconductor drum 7. The signal is outputted in synchronism with the signal applied to the photo-sensor 11 through a line.

In the present embodiment, since the positional precision of the lenses is essentially determined at the manufacture of the lenses. Accordingly, when the lens 21 is to be mounted in the housing 20, it is only needed to pay attention to the mount position and the mount direction of the lens 21.

Figure 4:
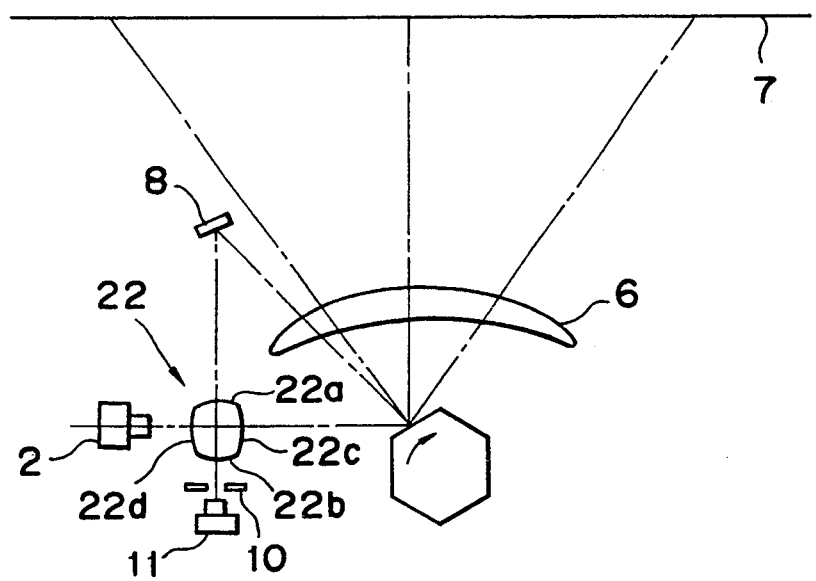

FIG. 4 shows a plan view of a second embodiment of the scanning optical device of the present invention. The like elements to those of FIG. 1 are designated by the like numerals and the explanation thereof is omitted.

Figure 5:
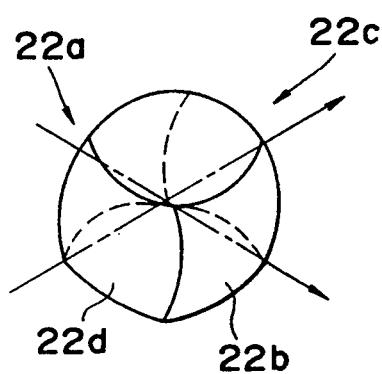

An integrally molded lens 22 has optical axes in two orthogonal directions and has two functions of a collimator lens for collimating the light beam emitted from the laser diode and a condenser lens for directing the laser beam transmitted through the fθ lens to the photodetector which generates a horizontal synchronous signal to determine the start position of recording on the photoconductor drum. FIG. 5 shows a perspective view of the lens 22. Planes 22a and 22b face each other, planes 22c and 22d face each other, the planes 22c and 22d function as the collimator lens, and the planes 22a and 22b function as the condenser lens to direct the deflected laser beam to the beam position detector. The laser diode 2 is arranged in front of the plane 22d on an optical axis of the portion of the lens 22 which functions as the collimator lens, the rotating polygon mirror 4 is arranged in front of the plane 22c, the fθ lens 6 is arranged in the direction of reflection substantially perpendicular thereto, and the photoconductor drum 7 is arranged ahead thereof. The stationary mirror 8 is arranged on an optical axis of the portion of the lens 22 which functions as the condenser lens, between the photoconductor drum 7 and the lens 22. The light transmitted through the fθ lens 6 and reflected by the stationary mirror 8 is directed perpendicularly to the plane 22a of the lens 22. The slit 10 and the photo-sensor 11 are arranged in sequence to face the plane 22b.

The laser beam emitted from the laser diode 2 is collimated by the planes 22d and 22c of the lens 22 and directed to the rotating polygon mirror 4, and the reflected light passes through the fθ lens 6 and is focused onto the photoconductor drum 7. A portion of the scanning light deflected by the rotating polygon mirror 4 and transmitted through the fθ lens 6 is reflected by the stationary mirror 8, passes through the planes 22a and 22b of the lens 22 and is directed to the photo-sensor 11, which generates the synchronous signal.

Figure 6:
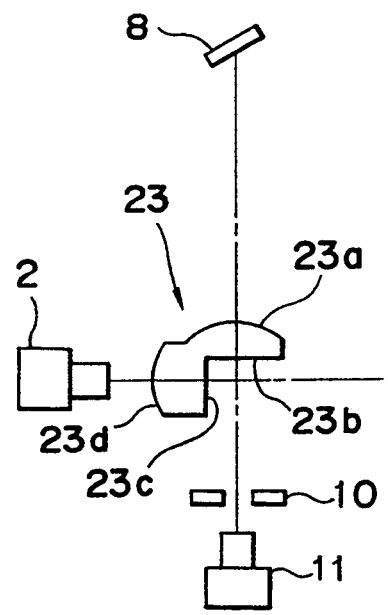

FIG. 6 shows a plan view of a third embodiment of the scanning optical device of the present invention. Instead of the shape of the lens 22 of the second embodiment, an integrally molded lens 23 is used. The lens 23 has a collimator lens for collimating the light emitted from the laser diode and a condenser lens coupled to the end of the collimator lens for directing the deflected laser beam to the beam position detector. Planes 23a and 23b function as the condenser lens and planes 23c and 23d function as the collimator lens. Other functions and constructions are identical to those of the second embodiment shown in FIG. 4.

In the second and third embodiments, the lenses of simpler shape than that of the first embodiment is used, and it is easier to keep the positional precision of the lenses than in the prior art device.

In the above embodiments, an optical fiber may be arranged instead of the photo-sensor 11 to guide the laser beam to other position through the optical fiber and the photo-sensor 11 may be arranged at the other position. The rotating polygon mirror 4 may have any number of planes and the lenses such as the collimeter lens, the fθ lens and the condenser lens may be spherical or non-spherical depending on the desired optical property.

As above-mentioned, in accordance with the scanning optical device of the present invention in which the laser beam emitted from the laser oscillator is condensed by the first lens, deflected by the deflector, focused by the second lens onto the medium to be scanned, and the portion of the light transmitted through the second lens is deflected by the stationary mirror and focused to the photo-sensor by the third lens so that the output of the photo-sensor triggers the horizontal synchronous signal, at least two of the first lens, the second lens and the third lens are integrally formed.

The integrated lens is preferably formed by synthetic resin molding.

In the scanning optical device of the present invention, a plurality of lenses are integrated to reduce the number of parts, reduce the freedom of positioning of the lenses, facilitate to keep the positional precision of the lenses, facilitate the assembling and reduce the cost.

Other embodiments of the scanning optical device of the present invention are now explained.

Figure 7:
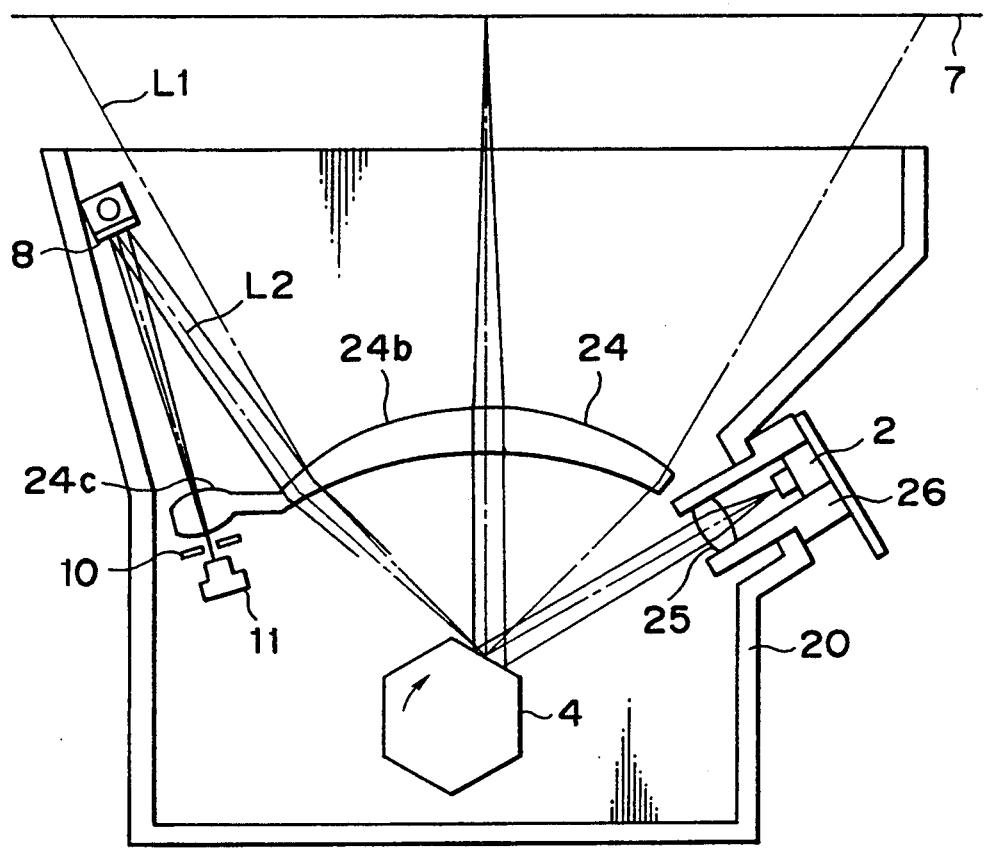
FIG. 7 shows a plan view of a fourth embodiment of the scanning optical device of the present invention.

FIG. 7 shows a plan view of a fourth embodiment of the scanning optical device of the present invention. The like elements to those of FIG. 2 are designated by the like numerals and the explanation thereof is omitted. An integrally molded lens 24 has a function of an f$\theta$ lens 24b for scanning the laser beam deflected by the rotating polygon mirror 4 at a constant velocity on the photoconductor drum 7 and a condenser lens 24c for directing the laser beam transmitted through the f$\theta$ lens to the photo-detector which generates the horizontal synchronous signal to determine the start position of recording on the photoconductor drum 7. Numeral 25 denotes a collimator lens which collimates the light emitted from the laser diode 2. The laser diode 2 and the collimator lens 25 are assembled in a collimator unit 26 in union. The collimator unit 26 is mounted in the housing 20.

In the construction shown in FIG. 7, the collimator lens 25 may be moved for adjustment along the optical axis independently from the lens 24.

Figure 8:
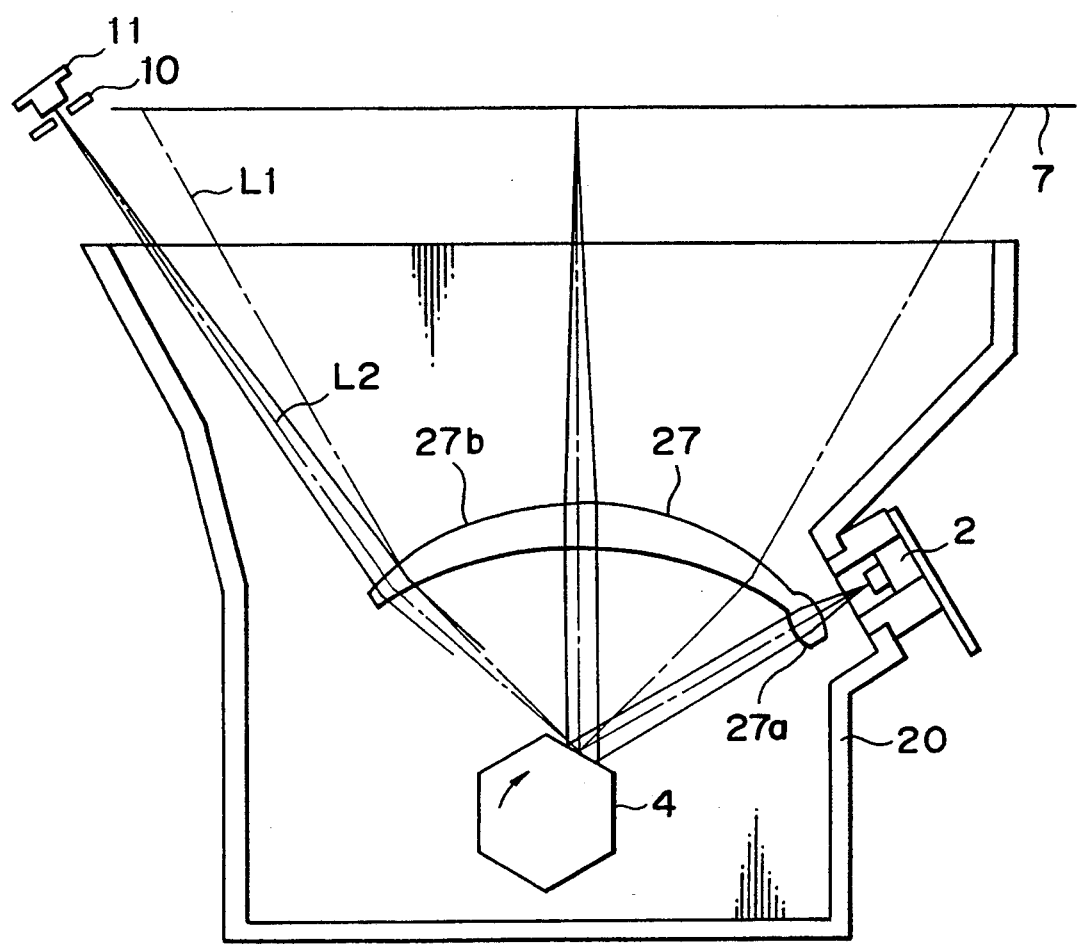
FIG. 8 shows a plan view of a fifth embodiment of the scanning optical device of the present inventions.

FIG. 8 shows a plan view of a fifth embodiment of the scanning optical device of the present invention. The like elements to those of FIG. 2 are designated by the like numerals and the explanation thereof is omitted. An integrally molded lens 27 has a function of a collimator lens 27a for collimating the light emitted from the laser diode 2 and an f$\theta$ lens 27b for scanning the laser beam deflected by the rotating polygon mirror 4 at a constant velocity on the photoconductor drum 7.

In the construction of FIG. 8., the stationary mirror 8 and the condenser lens 21c used in the device of FIG. 2 are not necessary and the cost can be reduced.

Figure 9:
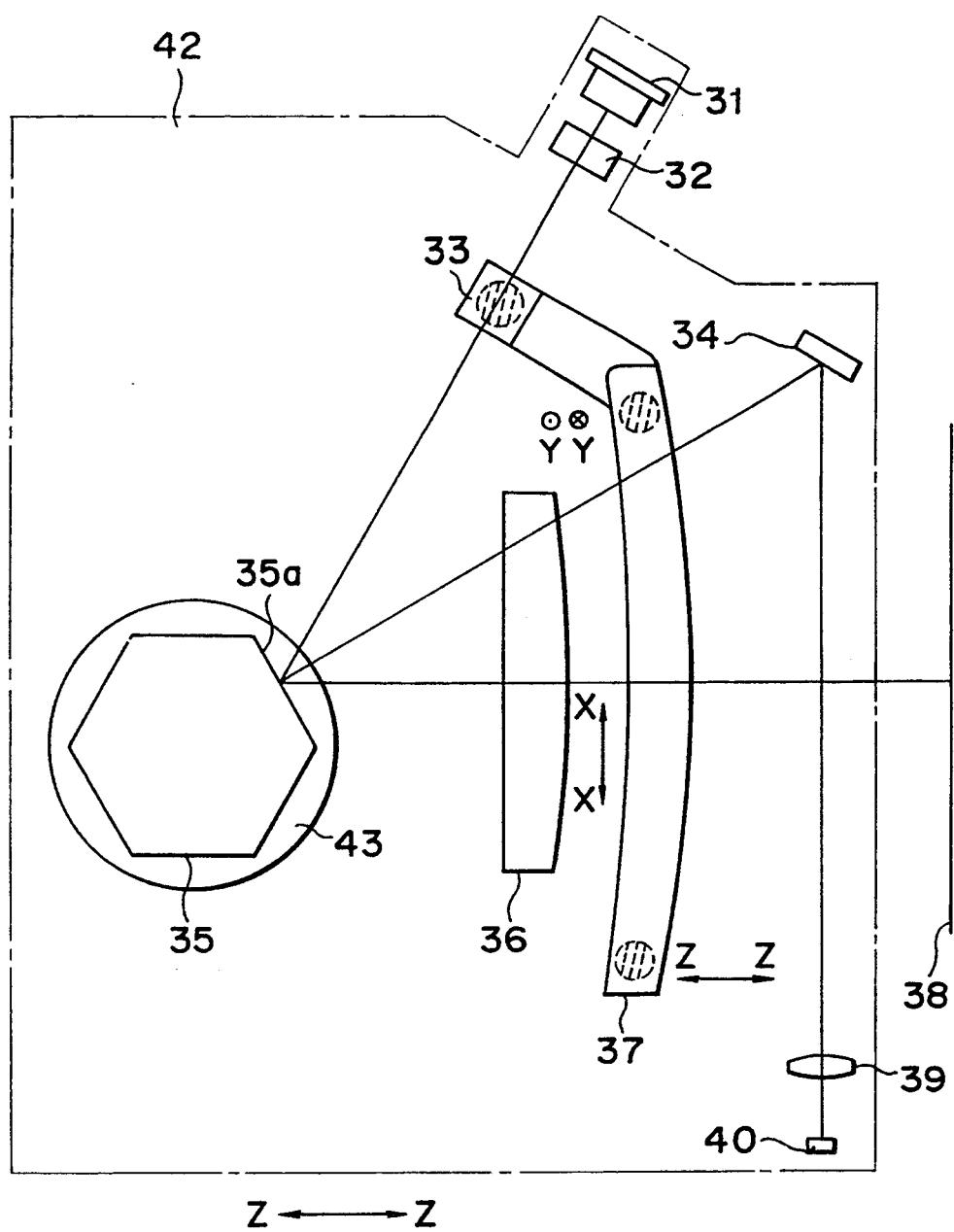
FIG. 9 shows a sectional view of a sixth embodiment of the scanning optical device of the present invention.

FIG. 9 shows a sectional view of a sixth embodiment of the scanning optical device of the present invention. FIG. 9 illustrates a function in a sectional plane which is parallel to the deflection plane (light beam plane formed by the light beam deflected by the deflection/reflection plane of the rotating polygon mirror).

The scanning optical device is accommodated in an optical box 42. The scanning optical device comprises a semiconductor laser 31, a collimator lens 32 for collimating the light beam generated by the semiconductor laser 31, a cylindrical lens 33 for linearly focusing the collimated light beam from the collimator lens 32, a rotating polygon mirror 35 having a deflection/reflection plane 35a located in the vicinity of a line image of the light beam focused by the cylindrical lens 33, a motor 43 for rotating the rotating polygon mirror 35, an f$\theta$ lens 36, a cylindrical lens 37, a mirror 34, a condenser lens 39 for condensing the light beam deflected by the mirror 34 and a photo-detector 40 for detecting the light beam condensed by the condenser lens 39 to generate a horizontal synchronous signal to determine the start position of recording on a photoconductor 38.

The light beam deflected and reflected by the deflection/reflection plane 35a is focused onto the photoconductor 38 through the f$\theta$ lens 36 and the cylindrical lens 37. The optical box 42 is closed by a cover (not shown). The f$\theta$ lens is designed such that the light beam reflected by the deflection/reflection plane 35a forms a spot on the photoconductor 38 and a scanning velocity of the spot is kept constant. In a plane which contains the optical axis of the f$\theta$ lens 36 and is perpendicular to the deflection plane, the deflection/reflection plane 35a and the surface of the photoconductor 38 are kept optically conjugage by the f$\theta$ lens 36 and the cylindrical lens 37.

A main scan by the light beam is effected on the photoconductor 38 by the rotation of the rotating polygon mirror 35, and a sub-scan is effected by rotating the photoconductor 38 around an axis of the cylinder. In this manner, an electrostatic latent image is formed on the surface of the photoconductor 38.

Arranged around the photoconductor 38 are a corona discharger for uniformly charging the surface of the photoconductor 38, a developing unit for visualizing the electrostatic latent image formed on the surface of the photoconductor 38 into a toner image, and a transferring corona discharger for transferring the toner image to a record sheet (all are not shown). By the functions of those elements, record information corresponding to the light beam generated by the semiconductor laser 31 is printed on the record sheet.

The irradiation position of the light beam generated by the semiconductor laser 31 is adjusted by moving the cylindrical lens 33 along the optical axis so that the light beam is linearly focused on the deflection/reflection plane 35a of the rotating polygon mirror 35 and moving the entire optical box 42 along the optical axis of the f$\theta$ lens 36 (ZZ in the figure) so that the light beam is focused on the photoconductor 38.

The cylindrical lens 33 in front of the rotating polygon mirror 35 and the cylindrical lens 37 behind the rotating polygon mirror 35 are plastic lenses which are in union.

In positioning the cylindrical lenses 33 and 37, one point on the cylindrical lens 33, for example, a center thereof (broken line hatched area) and two points of the cylindrical lens 37 (broken line hatched areas) are used in the direction perpendicular to the plane of drawing (YY). In the ZZ and XX directions, the cylindrical lens 37 is first positioned because the cylindrical lens 37 is larger in size than the cylindrical lens 33.

If it is difficult to move the entire optical box 42 along the optical axis of the f$\theta$ lens 36 for positioning, the shapes of the cylindrical lenses 33 and 37 are designed such that the cylindrical lens 33 is moved along the optical axis (ZZ) while the cylindrical lens 37 is fixed. A construction of such a scanning optical device is now explained with reference to FIGS. 10 and 11.

FIG. 10 shows a sectional view of a seventh embodiment of the scanning optical device of the present invention. FIG. 10 illustrates a function in a sectional plane which is parallel to the deflection plane (a plane of light beam formed by the light beam deflected by the deflection/reflection plane of the rotating polygon mirror). In FIG. 10, the like elements to those of FIG. 9 are designated by the like numerals and the explanation thereof is omitted. The cylindrical lens 33 and the cylindrical lens 37 are plastic lenses formed in union and a connecting member 43 has thickness at both ends and an opening 44 at a center. Thus, the connecting member 43 is elastically deformable and the cylindrical lens 33 may be moved along the optical axis (ZZ) while the cylindrical lens 37 is fixed.

Figure 11:
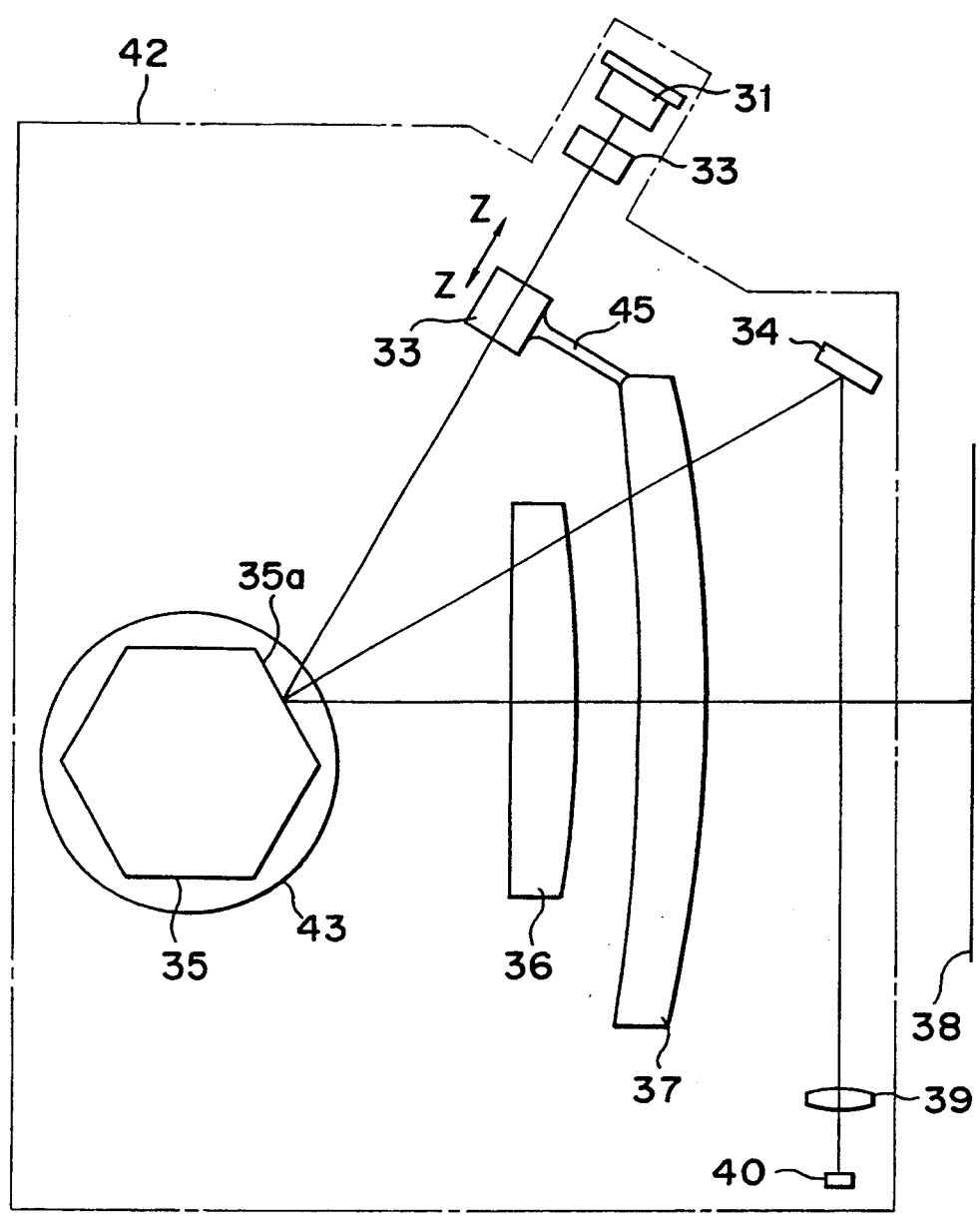

FIG. 11 shows a sectional view of an eighth embodiment of the scanning optical device of the present invention. FIG. 11 illustrates a function in a sectional plane which is parallel to the deflection plane (a plane of light beam formed by the light beam deflected by the deflection/reflection plane of the rotating polygon mirror). The like elements to those of FIG. 9 are designated by the like numerals and the explanation thereof is omitted. The cylindrical lens 33 and the cylindrical lens 37 are plastic lenses which are formed in union. A connecting member 45 has a thickness only at a center. As a result, the connecting member 45 is elastically deformable and the cylindrical lens 33 may be moved along the optical axis (ZZ) while the cylindrical lens 37 is fixed.

Figure 12:
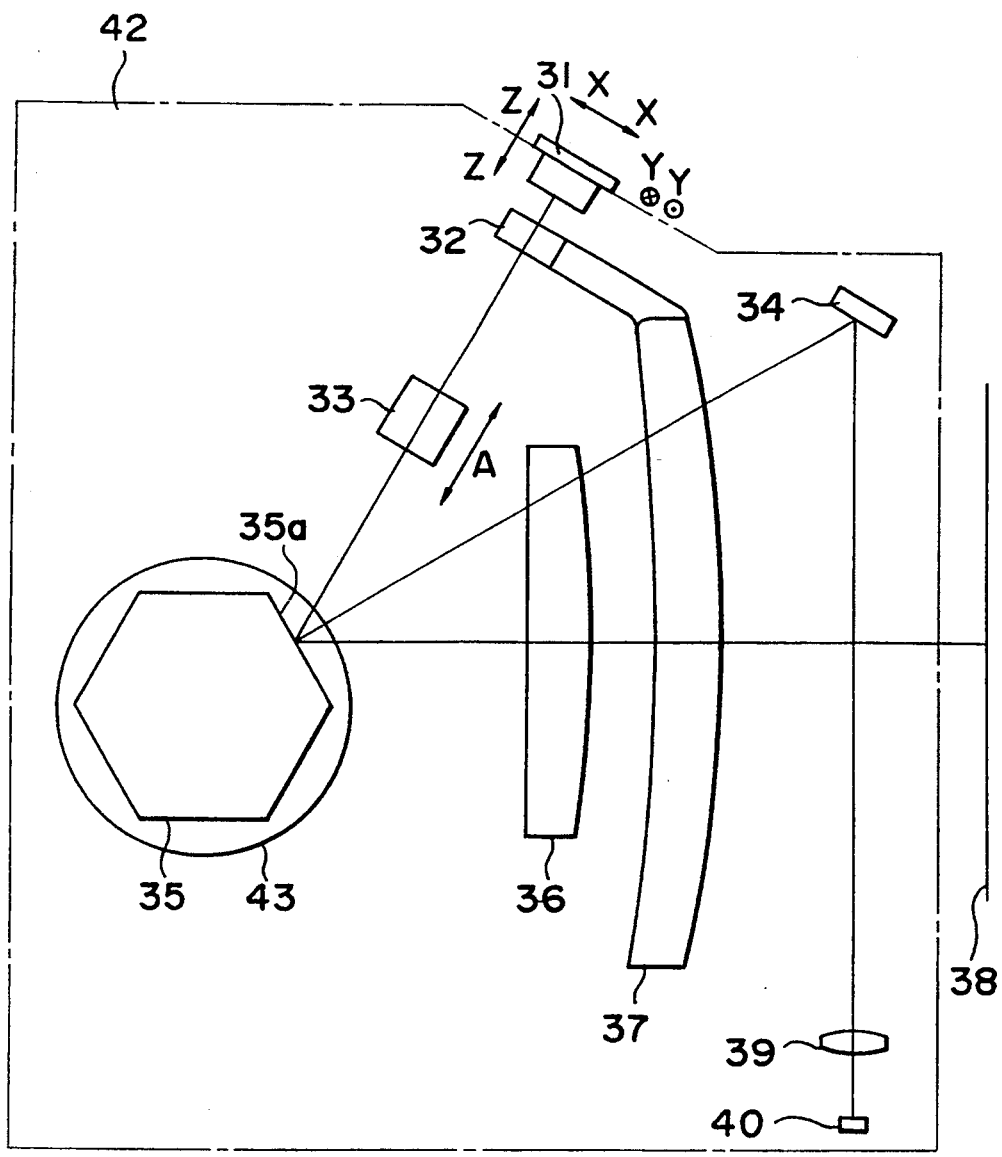
FIG. 12 shows a sectional view of a ninth embodiment of the scanning optical device of the present invention.

FIG. 12 shows a sectional view of a ninth embodiment of the scanning optical device of the present invention. FIG. 12 illustrates a function in a sectional plane which is parallel to the deflection plane (a plane of light beam formed by the light beam deflected by the deflection/reflection plane of the rotating polygon mirror).

The scanning optical device is accommodated in the optical box 42. The scanning optical device comprises a semiconductor laser 31, a collimator lens 32 for collimating the light beam emitted by the semiconductor laser 31, a cylindrical lens 33 for linearly focusing the collimated light beam from the collimator lens 32, a rotating polygon mirror 35 having a deflection/reflection plane 35a located in the vicinity of a line image of the light beam formed by the cylindrical lens 33, a motor 43 for rotating the rotating polygon mirror 35, an fθ lens 36, a cylindrical lens 37, a mirror 34, a condenser lens 39 for condensing the light beam deflected by the mirror 34 and a photo-detector 40 for detecting the light beam condensed by the condenser lens 39 to generate a horizontal synchronous signal to determine the start position of recording on a photoconductor 38.

The light beam deflected and reflected by the deflection/reflection plane 35a is focused onto the photoconductor 38 through the fθ lens 36 and the cylindrical lens 37. The optical box 42 is closed by a cover (not shown). The fθ lens 36 is designed such that the light beam reflected by the deflection/reflection plane 35a is focused to form a spot on the photoconductor 38 and a scanning velocity of the spot is kept constant. In the plane which contains the optical axis of the fθ lens 36 and is perpendicular to the deflection plane, the deflection/reflection plane 35a and the surface of the photoconductor 38 are kept optically conjugate by the fθ lens 36 and the cylindrical lens 37.

The collimator lens 32 and the cylindrical lens 37 are plastic lenses which are formed in union. In order for the light beam transmitted through the collimator lens 32 to be collimated, the semiconductor laser 31 is moved in three directions, the optical axis direction (ZZ), the XX direction which is perpendicular to the optical axis, and the direction (YY) normal to the plane of drawing, as shown in FIG. 12.

In accordance with the present construction, the cylindrical lens 33 may be freely moved along the optical axis (A) so that the light beam is linearly focused on the deflection/reflection plane 35a of the rotating polygon mirror 35.

Figure 13:
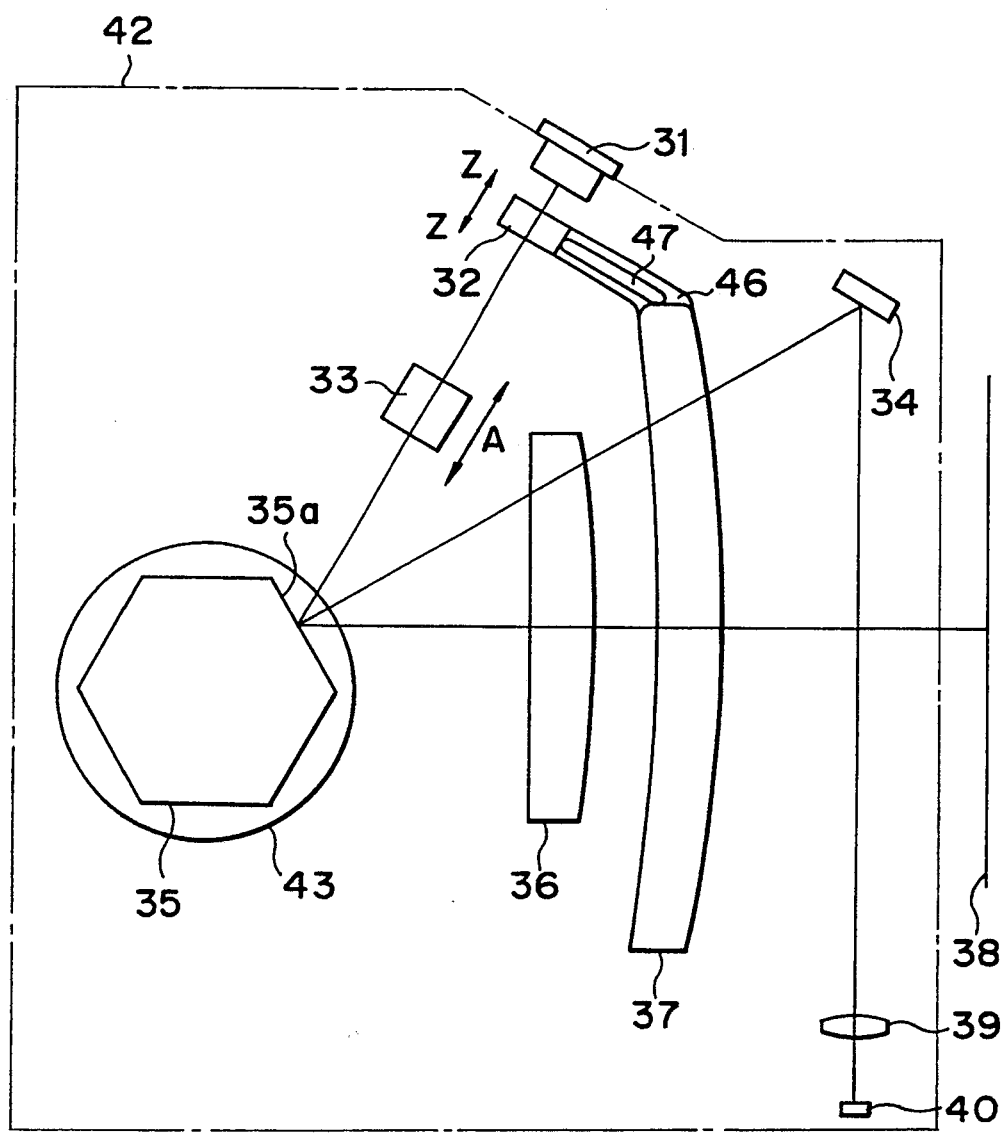
FIG. 13 shows a sectional view of an eighth embodiment of the scanning optical device of the present invention.

FIG. 13 shows a sectional view of a tenth embodiment of the scanning optical device of the present invention. FIG. 13 illustrates a function in a sectional plane which is parallel to the deflection plane (a plane of light beam formed by the light beam deflected by the deflection/reflection plane of the rotating polygon mirror). The like elements to those shown in FIG. 12 are designated by the like numerals and the explanation thereof is omitted. The collimator lens 32 and the cylindrical lens 37 are plastic lenses which are formed in union, and a connecting member 46 has thickness at the opposite end and an opening 47 at a center. As a result, the connecting member 46 is elastically deformable, and the collimator lens 32 may be moved along the optical axis (ZZ) while the cylindrical lens 37 is fixed. In accordance with the present construction, the cylindrical lens 33 may be freely moved along the optical axis (A) so that the light beam is-linearly focused onto the deflection/reflection plane 35a of the rotating polygon mirror 35.

Figure 14:
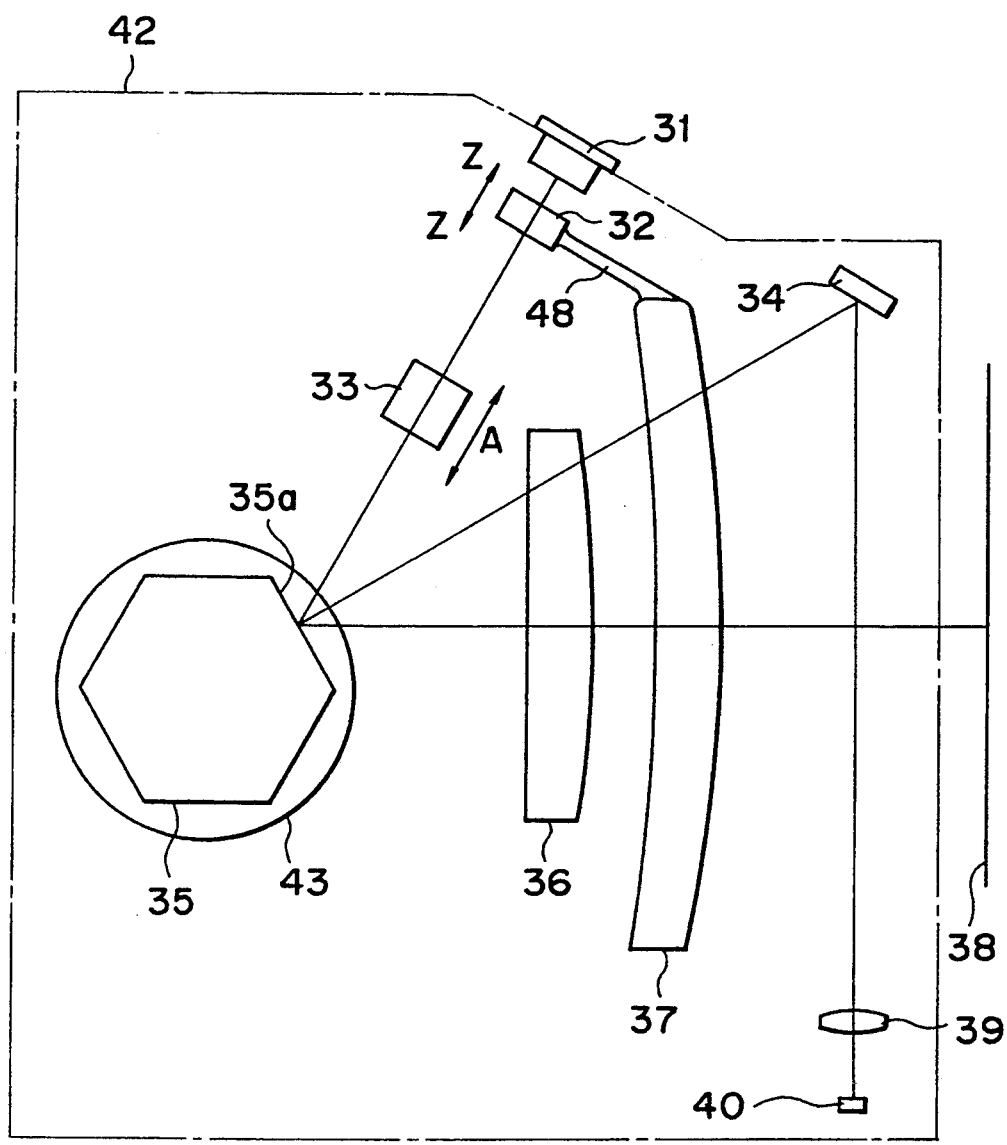
FIG. 14 shows a sectional view of an eleventh embodiment of the scanning optical device of the present invention.

FIG. 14 shows a sectional view of an eleventh embodiment of the scanning optical device of the present invention. FIG. 14 illustrates a function in a sectional plane which is parallel to the deflection plane (a plane of light beam formed by the light beam deflected by the deflection/reflection plane of the rotating polygon mirror). The like elements to those shown in FIG. 12 are designated by the like numerals and the explanation thereof is omitted. The collimator lens 32 and the cylindrical lens 37 are plastic lenses which are formed in union. A connecting member 48 has thickness only at a center. As a result, the connecting member 48 is elastically deformable and the cylindrical lens 33 may be moved along the optical axis (ZZ) while the cylindrical lens 37 is fixed. In accordance with the present construction, the cylindrical lens may be freely moved along the optical axis (A) so that the light beam is linearly focused onto the deflection/reflection plane 35a of the rotating polygon mirror 35.

Figure 15:
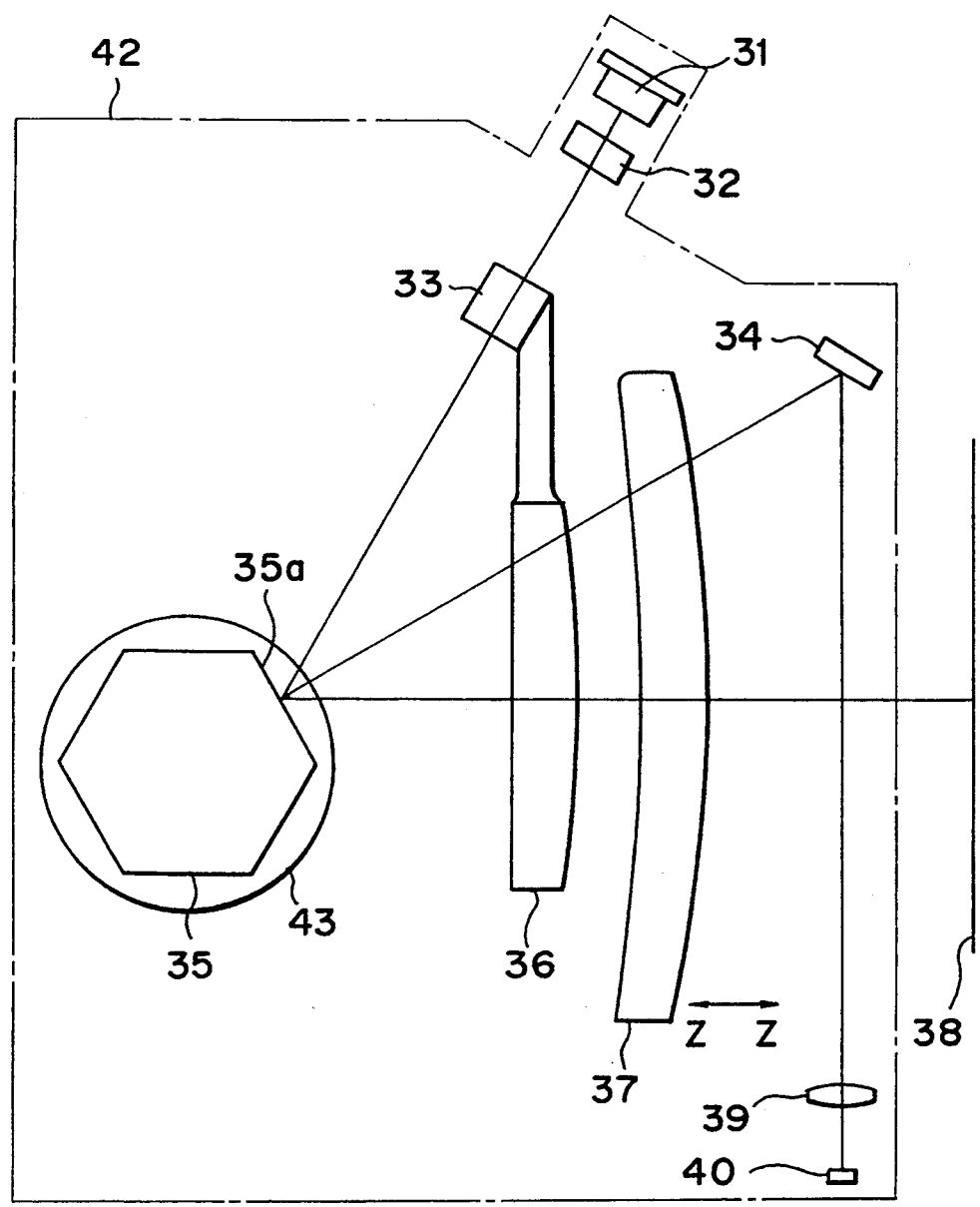
FIG. 15 shows a sectional view of a twelveth embodiment of the scanning optical device of the present invention.

FIG. 15 shows a sectional view of a twelveth embodiment of the scanning optical device of the present invention. FIG. 15 illustrates a function in a sectional plane which is parallel to the deflection plane (a plane of light beam formed by the light beam deflected by the deflection/reflection plane of the rotating polygon mirror). The like elements to those shown in FIG. 9 are designated by the like numerals and the explanation thereof is omitted. The cylindrical lens 33 and the fθ lens 36 are plastic lenses which are formed in union. In accordance with the present construction, the cylindrical lens 37 may be moved freely along the optical axis (ZZ).

FIG. 16 shows a sectional view of a thirteenth embodiment of the scanning optical device of the present invention. FIG. 16 illustrates a function in a sectional plane which is parallel to the deflection plane (a plane of light beam formed by the light beam deflected by the deflection) reflection plane of the rotating polygon mirror).

The scanning optical device is accommodated in the optical box 42. The scanning optical device comprises a semiconductor laser 31, a collimator lens 32 for collimating the light beam emitted from the semiconductor laser 31, a cylindrical lens 33 for linearly focusing the collimated light beam from the collimator lens 32, a rotating polygon mirror 35 having a deflection/reflection plane 35a located in the vicinity of a line image of the light beam formed by the cylindrical lens 33, a motor 43 for rotating the rotating polygon mirror 35, an fθ lens 50, a mirror 34, a condenser lens 39 for condensing the light beam deflected by the mirror 34 and a photo-detector 40 for detecting the light beam condensed by the condenser lens 39 to generate a horizontal synchronous signal to determine the start position of recording on the photoconductor 38.

The fθ lens 50 is designed such that the light beam reflected by the deflection/reflection plane 35a is focused to form a spot on the photoconductor and a scanning velocity of the spot is kept constant. In order to attain such a property of the fθ lens 50, the fθ lens 50 is formed by two lenses, a spherical lens 51 and a toric lens 52. In a plane which contains the optical axis of the fθ lens 50 and is perpendicular to the deflection plane, the deflection/reflection plane 35a and the surface of the photoconductor 38 are kept optically conjugate by the spherical lens 51 and the toric lens 52.

The collimator lens 32 and the toric lens 52 are plastic lenses which are formed in union. Further, the cylindrical lens 33 and the spherical lens 51 are plastic lenses which are formed in union. In accordance with the present construction, the number of parts is further reduced and the cost is further reduced.

In the above embodiments, the collimator lens, the cylindrical lens and the fθ lens may be fixed to the optical box by known means such as ultraviolet ray cured adhesive material or leaf springs.

We claim:

1. A scanning optical device comprising:
a light source;
a deflector for deflecting a light beam from said light source;
optical means having an edge portion and a center portion, said edge portion including first optical means for directing the light beam from said light source to said deflector, and said center portion including second optical means for directing the light beam deflected by said deflector to a predetermined plane;
said second optical means having an optical function which differs from that of said first optical means; and
said second optical means being integrally formed with said first optical means.

2. A scanning optical device according to claim 1 wherein said first optical means is a collimator lens.

3. A scanning optical device according to claim 1 wherein said first optical means is a cylindrical lens.

4. A scanning optical device according to claim 1 wherein said second optical means is a cylindrical lens.

5. A scanning optical device according to claim 1 wherein said second optical means is an fθ lens.

6. A scanning optical device comprising:
a light source;
a deflector for deflecting a light beam from said light source;
photo-receiving means for receiving the light beam deflected by said deflector, wherein said photo-receiving means detects a synchronous signal for determining a start timing of modulation of said light source; and
an optical member including first optical means and second optical means, said first optical means for directing the light beam from said light source to said deflector, and said second optical means for directing the light beam deflected by said deflector to said photo-receiving means;
said second optical means being integrally formed with said first optical means.

7. A scanning optical device according to claim 6 wherein said first optical means is a collimator lens.

8. A scanning optical device comprising:
a light source;
a deflector for deflecting a light beam from said light source;
photo-receiving means for receiving the light beam deflected by said deflector, wherein said photo-receiving means detects a synchronous signal to determine a start timing of modulation of said light source; and
an optical member including first, second an third optical means, said first optical means for directing the light beam from said light source to said deflector, said second optical means for directing the beam deflected by said deflector to a predetermined plane, and said third optical means for directing the light beam deflected by said deflector to said photo-receiving means;
said first and second and third optical means being integrally formed.

9. A scanning optical device comprising:
a light source;
a deflector for deflecting a light beam from said light source;
an optical member having first optical means and second optical means, said first optical means for directing the light beam from said light source to said deflector, and said second optical means for directing the light beam deflected by said deflector to a predetermined plane;
said second optical means having an optical function which differs from said first optical means;
said second optical means being integrally formed with said first optical means; and
a housing for accommodating said light source, said deflector, said first optical means and said second optical means.

10. A scanning optical device comprising:
a light source;
a deflector for deflecting a light beam from said light source;
photo-receiving means for receiving the light beam deflected by said deflector, wherein said photo-receiving means detects a synchronous signal for determining a start timing of modulation of said light source;
an optical member including first optical means and second optical means, said first optical means for directing the light beam from said light source to said deflector, and said second optical means for directing the light beam deflected by said deflector to said photo-receiving means;
said second optical means being integrally formed with said first optical means; and
a housing for accommodating said light source, said deflector, said first optical means, said photo-receiving means and said second optical means.

11. A scanning optical device comprising:
a light source;
a deflector for deflecting a light beam from said light source;

photo-receiving means for receiving the light beam deflected by said deflector, wherein said photo-receiving means detects a synchronous signal for determining a start timing of modulation of said light source;

an optical member including first, second and third optical means, said first optical means for directing the light beam from said light source to said deflector, said second optical means for directing the light beam deflected by said deflector to a predetermined plane, and said third optical means for directing the light beam deflected by said deflector to said photo-receiving means;

said first and second and third optical means being integrally formed; and a housing for accommodating said light source, said deflector, said first optical means, said second optical means, said photo-sensing means and said third optical means.

12. A recorder comprising:
a light source;
a deflector for deflecting a light beam from said light source;
a recording medium;
an optical member having first optical means and second optical means, said first optical means for directing the light beam from said light source to said deflector and said second optical means for directing the light beam deflected by said deflector to said recording medium;

said second optical means having an optical function which differs from that of said first optical means; and said second optical means being integrally formed with said first optical means.

13. A recorder comprising:
a light source;
a deflector for deflecting a light beam from said light source;
a detector for detecting the light beam deflected by said deflector, wherein said detector detects a synchronous signal for determining a start timing of modulation of said light source;
an optical member including first optical means and second optical means, said first optical means for directing the light beam from said light source to said deflector, and said second optical means for directing the light beam deflected by said deflector to said detector;
said second optical means being integrally formed with said first optical means; and
a recording medium which receives the light beam deflected by said deflector.

14. A recorder comprising:
a light source;
a deflector for deflecting a light beam from said light source;
a recording medium;
photo-receiving means for receiving the light beam deflected by said deflector, wherein said photo-receiving means detects a synchronous signal for determining a start timing of modulation of said light source; and
an optical member including first, second and third optical means, said first optical means for directing the light beam from said light source to said deflector, said second optical means for directing the light beam deflected by said deflector to said recording medium, and said third optical means for directing the light beam deflected by said deflector to said photo-receiving means;
said first and second and third optical means being integrally formed.

15. A device according to claim 8, 9, 10, 12, 13, 14, wherein said first optical means comprises a collimator lens.

16. A device according to claim 8, 9, 10, 11, 12, 13 or 14, wherein said second optical means comprises an fθ lens.

17. A device according to claim 8, 11 or 14, wherein said third optical means comprises a condenser lens.

18. A device according to claim 6, 8, 10, 11, 13 or 14, wherein said first and second optical means are different from each other.

19. A device according to claim 8, 11 or 14, wherein said first and second and third optical means are all different from each other.

20. A scanning optical device, comprising:
a light source;
a deflector for deflecting a light beam from said light source;
photo-receiving means for receiving the light beam deflected by said deflector to detect a synchronous signal for determining a start timing of modulation of said light source; and
an optical member including first optical means and second optical means, said first optical means for directing the light beam deflected by said deflector to a predetermined surface, and said second optical means for directing the light beam deflected by said deflector to said photo-receiving means,
said second optical means having an optical function which differs from that of said first optical means, and said second optical means being different from said first optical means and being formed integrally with said first optical means.

21. A scanning optical device according to claim 20, wherein said first optical means comprises a lens portion having an fθ function.

22. A scanning optical device, comprising:
a light source;
a deflector for deflecting a light beam from said light source;
photo-receiving means for receiving the light beam deflected by said deflector to detect a synchronous signal for determining a start timing of modulation of said light source;
an optical member including first optical means and second optical means, said first optical means for directing the light beam deflected by said deflector to a predetermined surface, and said second optical means for directing the light beam deflected by said deflector to said photo-receiving means, said second optical means having an optical function which differs from that of said first optical means, and said second optical means being different from said first optical means and being formed integrally with said first optical means; and
a housing for accommodating said light source, said deflector, said first optical means, said photo-receiving means and said second optical means.

23. A recorder, comprising:
a light source;
a deflector for deflecting a light beam from said light source;

a recording medium; photo-receiving means for receiving the light beam deflected by said deflector to detect a synchronous signal for determining a start timing of modulation of said light source; and
an optical member including first optical means and second optical means, said first optical means for directing the light beam deflected by said deflector to said recording medium, and said second optical means for directing the light beam deflected by said deflector to said photo-receiving means,
said second optical means having an optical function which differs from that of said first optical means, and said second optical means being different from said first optical means and being formed integrally with said first optical means.

24. A scanning optical device, comprising:
a light source;
a deflector for deflecting a light beam from said light source;
a collimator lens for directing the light beam from said light source to said deflector; and
lens means for directing the light beam deflected by said deflector to a predetermined plane, said lens means and said collimator lens being formed on the same optical member.

25. A device according to claim 24, wherein said lens means is a lens portion having $f\theta$ function.

26. A device according to claim 24, wherein said optical member is formed of resin material.

27. A recorder comprising:
a light source;
a deflector for deflecting a light beam from said light source;
a collimator lens for directing the light beam from said light source to said deflector;
a recording medium; and
lens means for directing the light beam deflected by said deflector to a predetermined plane, said lens means and said collimator lens being formed on the same optical member.

28. A recorder according to claim 27, wherein said lens means is a lens portion having $f\theta$ function.

29. A recorder according to claim 27, wherein said optical member is formed of resin material.

30. A scanning optical device comprising:
a light source;
first optical means for linearly condensing a light beam from said light source;
a deflector having a deflection reflecting plane in the vicinity of a linear image formed by said first optical means; and
second optical means for directing the light beam deflected by said deflector to a predetermined plane, said first and second optical means being formed on the same optical member.

31. A device according to claim 30, wherein said first optical means is a cylindrical lens.

32. A device according to claim 30, wherein said second optical means is a lens portion having $f\theta$ function.

33. A recorder according to claim 30, wherein said optical member is formed of resin material.

34. A recorder comprising:
a light source;
first optical means for linearly condensing a light beam from said light source;
a deflector having a deflection reflecting plane in the vicinity of a linear image formed by said first optical means;
a recording medium; and
second optical means for directing the light beam deflected by said deflector to a predetermined plane, said first and second optical means being formed on the same optical member.

35. A recorder according to claim 34, wherein said first optical means is a cylindrical lens.

36. A recorder according to claim 34, wherein said second optical means is a lens portion having $f\theta$ function.

37. A recorder according to claim 34, wherein said optical member is formed of resin material.

38. A device according to claim 1, wherein said optical member is formed of resin material.

39. A device according to claim 9, wherein said optical member is formed of resin material.

40. A recorder according to claim 2, wherein said optical member is formed of resin material.

41. A device according to claim 6, wherein said first and second optical means are integrally formed of resin material.

42. A device according to claim 10, wherein said first and second optical means are integrally formed of resin material.

43. A recorder according to claim 13, wherein said first and second optical means are integrally formed of resin material.

44. A device according to claim 8, wherein said first, second and third optical means are integrally formed of resin material.

45. A device according to claim 11, wherein said first, second and third optical means are integrally formed of resin material.

46. A recorder according to claim 14, wherein said first, second and third optical means are integrally formed of resin material.

47. A device according to claim 20, wherein said first and second optical means are integrally formed of resin material.

48. A device according to claim 22, wherein said first and second optical means are integrally formed of resin material.

49. A recorder according to claim 23, wherein said first and second optical means are integrally formed of resin material.

* * * * *

UNITED STATES PATENT AND TRADEMARK OFFICE
CERTIFICATE OF CORRECTION

PATENT NO. : 5,365,259
DATED : November 15, 1994
INVENTOR(S) : Masanobu Kanoto and Yasuo Suzuki It is certified that error appears in the above-identified patent and that said Letters Patent is hereby corrected as shown below:

Under References Cited, change the U.S. Patent Documents section to read as follows:

```
--4,796,962  1/1989  DeJager et al. ..... 359/206
  4,796,963  1/1989  Yohsimura  .......... 359/206
  4,868,673  9/1989  Negoro  ............. 346/108--.
```

Column 2, line 15, change "inventions," to --invention,--.

Column 3, line 65, delete "since".

Column 4, line 62, change "other" to --another--; and line 65, change "collimeter" to --collimator--.

Column 8, line 21, change "is-linearly" to --is linearly--.

UNITED STATES PATENT AND TRADEMARK OFFICE
CERTIFICATE OF CORRECTION

PATENT NO. : 5,365,259
DATED : November 15, 1994
INVENTOR(S) : Masanobu Kanoto and Yasuo Suzuki It is certified that error appears in the above-identified patent and that said Letters Patent is hereby corrected as shown below:

Column 10, line 17, change "an third" to --and third--;
line 21, change "beam" to --light beam--.

Column 12, line 6, change "12, 13, 14," to --11, 12, 13 or 14,--.

Column 14, line 29, change "claim 2," to --claim 12,--.

Signed and Sealed this

Eighteenth Day of April, 1995

Attest:

BRUCE LEHMAN

Attesting Officer

Commissioner of Patents and Trademarks